Feb. 7, 1961   A. B. EREKSON ET AL   2,970,922
STORING CHEESE
Filed Feb. 24, 1959
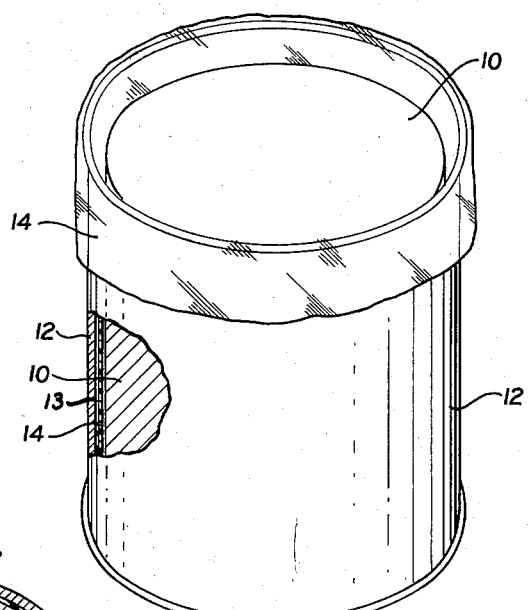
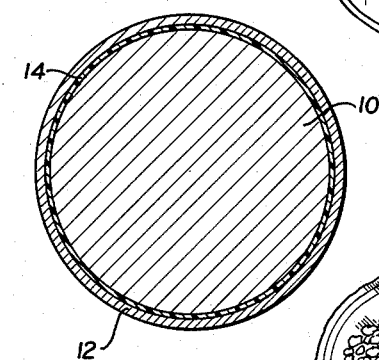
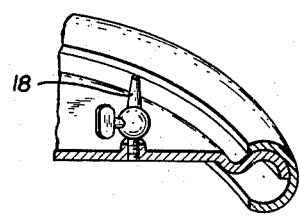
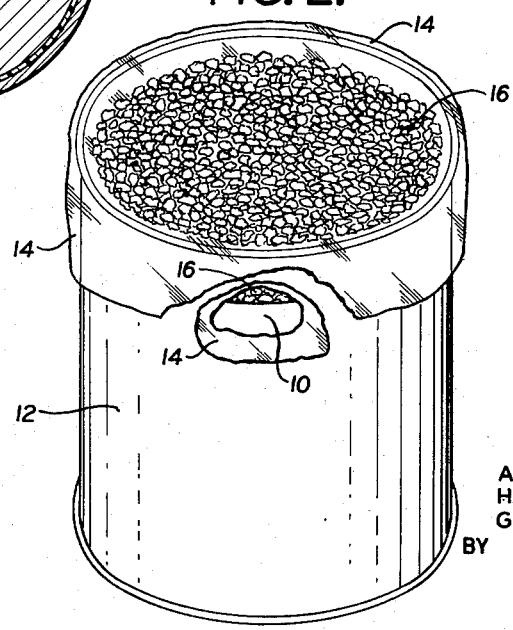
INVENTORS
ARTHUR B. EREKSON
HAROLD C. STEINKE
GEORGE MOHR
BY
ROBERT CALVERT
ATTORNEY.

United States Patent Office 2,970,922
Patented Feb. 7, 1961

2,970,922

STORING CHEESE

Arthur B. Erekson, Scarsdale, N.Y., and Harold C. Steinke and George Mohr, Plymouth, Wis., assignors to The Borden Company, New York, N.Y., a corporation of New Jersey Filed Feb. 24, 1959, Ser. No. 794,912

3 Claims. (Cl. 99—178)

This invention relates to the process of improving cheese for subsequent processing involving melting the cheese. The invention is particularly useful in connection with cheddar cheese and will be illustrated in connection with such use.

In the processing of such cheese into finished consumer units by steps including melting the cheese during said processing, there is difficulty in incorporating fat satisfactorily uniformly with the other components of the cheese, the fat being that contained in cheese made from whole milk, as for instance in cheddar. This cheese varies in fat content. By specification in the various countries it must be not below a minimum. This lower limit in the United States is at least 50% of fat on the dry basis and in other countries at least about 43%.

The present invention provides a process by which the fat-containing cheese may be stored without deterioration and is actually improved in working properties by the storage so that, when reprocessed as described, the cheese will contain the fat properly distributed throughout the entire mass.

Briefly stated, the invention comprises the introduction of a pressed cheese, the cheese being in warm condition and containing approximately 34%–40% of water by weight and not more than about 2.5% by volume of air, into an air-tight container with remaining air filled head space at the top of the container, causing the cheese in the warm condition to remain in the container until the cheese conforms approximately to the wall of the container or to the liner therewithin and forces air originally between the wall and the cheese into the said head space and removing oxygen of the air in the head space by the action of viable aerobia.

The invention will be illustrated by description in connection with the attached drawings in which Figs. 1 and 2 are views partly broken away for clearness of illustration, of successive stages in introducing first the cake of cheese and then the curd thereon into the container.

Fig. 3 is a transverse sectional view of the assembly of Fig. 1.

Fig. 4 is a fragmentary view of the lid for the container, with pressure equalizing valve.

Fig. 1 shows a presssed cheese 10 inside a container 12 and a plastic liner 14 therefor in the form of a bag with open upper end, the container shown being a drum into which the cheese and liner have been inserted. The container wall defines a space 13 around the pressed cheese. The plastic liner 14 extends through this space.

Fig. 2 shows the same assembly with the added layer of lumps of cheese curd 16 disposed over the top of the pressed cheese shown in Fig. 1.

The assembly with the top layer of cheese curd, as shown, is in condition for folding the liner 14 over the top of the curd and then inserting a tight head of the drum.

All parts of the drum when closed are air-tight. The head is provided with valve 18 for being opened before lid of the drum is removed at the time of use of the cheese. The opening releases the pressure within the container or admits air, as may be required, to equalize the pressure on the two sides of the lid.

All parts of the equipment not shown and all parts of the cheese making and reprocessing process not described herein are conventional.

Materials of construction are those that are usual for the parts of the class used in the present process. Thus the drums are suitably made of stainless steel, aluminum, enameled or tinned iron, or the like. The liner 14 is constructed of any suitable plastic such as polyethylene, polypropylene, Mylar (glycol phthalate ester), or nylon film, the polyethylene being economical and entirely satisfactory and therefore the one that we actually use.

The cheese curd 16 as well as the underlying cake of cheese contains viable aerobia which, under our conditions, consume the oxygen of air forced up into the top of the container and below the lid by the slow movement of the warm cheese therebelow into conformance with the walls of the container.

The aerobia used are S. lactis or S. cremoris. These are lactic acid-producing streptococci, commonly referred to as lactic acid bacteria. They introduce no foreign organism and are convenient, economical, and effective.

The cheese as introduced may be any fat-containing cheese in the form of wet curd.

As to the conditions of operation, cheddar cheese is first made in usual manner. The curd is pressed into the cake 10, the pressure on the cake 10 being about 0.2–1 p.s.i. and maintained for 8–48 and normally about 16 hours, to remove excessive amounts of water and air and to consolidate the cheese into a block which may be handled in usual manner.

The consolidated, shaped cheese is introduced into the polyethylene or like plastic liner 14 at a temperature of about 70°–105° F. and for best results within the range approximately 85°–100° F. Cheese so introduced into the liner and then into the container at such temperatures will expel air down to a proportion of not more than 15% of the total volume and ordinarly to approximately 5% or less. Under the pressure and in contact with the salt, which has been added to the curd in the amount of 2% or so before the pressing into the cake, the water content will be reduced to 35.5%–37.5% of water although a proportion within the range 34%–40% by weight of the pressed cake is permissible in some varieties of cheese.

After the pressed cake, with the plastic bag around the cake except for the open top, has been inserted into the container 12, then a layer of the cheese curd containing the viable lactic acid bacteria is applied over the top of the cake to a depth of about 1–4 inches, the curd being in the form of cubes or pieces of various shapes of longest dimension usually not over 1 inch. The plastic bag is then closed by being folded over the layer of cheese curd and the lid of the drum is made fast and practically air-tight within the top of the drum, a conventional gasket (not shown) being used for air-tight sealing.

Before use in the subsequent processing involving warming the cheese, the contents of the drum allowed to stand for at least 2 weeks and usually 2–4 weeks at a temperature not above 65° F. as between 32° and 60° F. during which there is spreading or flowing of the cheese mass against the liner so as to force the liner in turn into substantially conforming contact with the liner of the interior wall of the barrel at all points except in the free space above the cake of cheese. In this space there collects the air which was previously between the cake of cheese and the walls (or liner) of the container and also some of the air originally within the cheese. The viable aerobia in the cake of cheese is adequate to consume the oxygen in this relatively small volume of air retained in pores in the pressed cake. The remainder of the air in the said free space is deoxygenated by the growth of the lactic acid bacteria in the cheese curd at the top, the lumps of curd presenting a relatively large specific area and, therefore, a large area of contact with the air. The result is effective deoxidation of the air.

The invention will be further illustrated by detailed description in connection with the following specific examples of the practice of it. Proportions used in these examples and elsewhere herein are expressed as parts by weight unless specifically stated to the contrary.

*Example 1*

Cheddar cheese is pressed over night into a firm cake of size to fit loosely within a steel drum and leave about a 3 inch air space above the cheese and below the level of the top of the drum. The pressure on the cheese is continued until the moisture content becomes approximately 36%–36.5% of the total weight and the air volume approximately 5% of the volume of the pressed cake.

A polyethylene bag is then placed around the pressed cheese cake at a temperature within the cake of about 90° F. The whole is then placed in a steel drum as illustrated in Example 1.

A layer of cheddar cheese cubes of sizes about 1 cubic inch but somewhat rounded and fractured by handling is then laid to a depth of 3 inches over the upper end of the cake of cheese within the open end of the plastic bag. The top ends of the bag are then folded over the cheese and a lid inserted into the top of the drum with a suitable gasket between the lid and the drum, to increase the tightness of closing.

*Example 2*

The cheese barreled as described in Example 1 is stored for a period of 4 weeks and then is processed in the following manner.

The cheese is removed from the barrel and cut into slabs of suitable size to be sent through a conventional grinder for comminuting the cheese to a particle size of $\frac{1}{16}$ inch diameter or less. After being comminuted, the cheese is placed in a cooker provided with vigorous agitation. Direct steam is injected into the cooker and into the comminuted product, to which have been added 2%–2.5% disodium phosphate or sodium citrate and sufficient water to bring the moisture content of the finished product, including the moisture added by the direct steam injection, up to the maximum of 40%.

The heating is continued until the temperature reaches about 160° F. or until the product is smooth and homogeneous in appearance and has fairly good plastic flow. It is then transferred to automatic filling and packaging equipment where the packaging takes place. The filled packages are cooled to room temperature or lower.

This product when melted has good plastic flow so that, as the cheese is filled into the packages, it will conform to the shape of the package and leave no space which might entrap air and permit subsequent mold growth.

If the cheese has been insufficiently aged, defects appear at times either of which makes an unsatisfactory finished product. One is a thickening or setting of the cheese so that it does not have sufficient plastic flow when melted and packaged to close voids and conform to the shape of the container into which the heated material is introduced, so that air is left which permits mold spoilage. The other defect is a lack of complete emulsification of the butter fat which results, after melting and casting of the cheese in reprocessing. The result is an oily, grainy product which separates fat readily and is entirely unacceptable from a consumer standpoint.

It is to be understood that it is intended to cover all changes and modifications of the examples of the invention herein chosen for the purposes of illustration which do not constitute departures from the spirit and scope of the invention.

We claim:

1. In storing and improving cheese for further processing involving melting, the process which comprises pressing wet fat-containing cheese curd into a firm cake containing not more than approximately 34%–40% of water by weight, introducing the pressed cake so formed, at a temperature of the cake within the approximate range 70°–105° F., into a container having air-tight walls defining a space around the said cake, applying a layer of wet cheese curd in lump form including viable lactic acid bacteria over the top of the cake, closing the container with the cake of cheese and lump curd therein substantially air tight, maintaining the container in upright position, and retaining the cheese in the closed upright container for a period of at least 2 weeks at a temperature not above approximately 65° F., the cheese during the said period moving closer to conformance with the wall of the container and forcing air from the said space upwardly to the position of the said curd.

2. The process of claim 1, the said cake and also the curd in lump form being cheddar cheese.

3. The process of claim 1, the said layer of cheese curd being at least 1 inch thick.

References Cited in the file of this patent
UNITED STATES PATENTS 2,825,651     Loo et al. _____ Mar. 4, 1958
2,882,169     Kielsmeier et al. _____ Apr. 14, 1959

OTHER REFERENCES

"Varieties of Cheese," United States Department of Agriculture, Bulletin No. 608, revised February 1932, page 29.